United States Patent
Satou et al.

(10) Patent No.: US 9,401,591 B2
(45) Date of Patent: Jul. 26, 2016

(54) WIRING STRUCTURE OF ELECTRIC WIRE

(75) Inventors: Kunihiko Satou, Kosai (JP); Atsuyoshi Yamaguchi, Kosai (JP)

(73) Assignee: YAZAKI CORPORATION, Tokyo (JP)

(*) Notice: Subject to any disclaimer, the term of this patent is extended or adjusted under 35 U.S.C. 154(b) by 153 days.

(21) Appl. No.: 13/395,380

(22) PCT Filed: May 16, 2011

(86) PCT No.: PCT/JP2011/061249
§ 371 (c)(1),
(2), (4) Date: Mar. 9, 2012

(87) PCT Pub. No.: WO2011/145587
PCT Pub. Date: Nov. 24, 2011

(65) Prior Publication Data
US 2012/0168225 A1    Jul. 5, 2012

(30) Foreign Application Priority Data

May 17, 2010  (JP) ................................. 2010-113376
May 17, 2010  (JP) ................................. 2010-113377

(51) Int. Cl.
*H02G 15/14* (2006.01)
*H02G 11/00* (2006.01)
(Continued)

(52) U.S. Cl.
CPC ............... *H02G 11/006* (2013.01); *B60N 2/06* (2013.01); *B60N 2/16* (2013.01); *B60R 16/027* (2013.01); *B60R 16/0215* (2013.01); *H02G 3/0468* (2013.01); *B60N 2002/0264* (2013.01)

(58) Field of Classification Search
CPC ....... H02G 7/20; H02G 11/00; H02G 11/006; H02G 3/0468; H01B 11/04; H01B 11/06; B60N 2/44; B60N 2/06; B60N 2/16; B60N 2002/0265; B60R 16/02; B60R 16/027; B60R 16/0215

USPC ................................ 174/113 R, 99 R, 149 R
See application file for complete search history.

(56) References Cited

U.S. PATENT DOCUMENTS 6,095,461 A * 8/2000 Daoud ...................... F16L 3/01
248/65
6,327,139 B1 * 12/2001 Champion et al. ............ 361/608
(Continued)

FOREIGN PATENT DOCUMENTS

CN          1964147 A      5/2007
CN       101218727 A      7/2008
(Continued)

OTHER PUBLICATIONS

International Search Report (PCT/ISA/210) issued on Jun. 7, 2011 in the International Patent Application No. PCT/JP2011/061249.
(Continued)

*Primary Examiner* — Jenny L Wagner
*Assistant Examiner* — Pete Lee
(74) *Attorney, Agent, or Firm* — Sughrue Mion, PLLC

(57) ABSTRACT

A wiring structure of electric wire is provided in which the efficiency of wiring electric wires can be improved and the wiring space can be saved. The wiring structure of electric wire includes an electric wire having a U-shaped excessive part provided in its middle part along the relatively-moving direction of two structures, and a longitudinally-appended spring member provided longitudinally along the electric wire. Fixing positions P1 and P2 of opposite ends of the electric wire are set to offset positions which are deviated in position respectively in two directions perpendicular to the relatively-moving direction of the two structures, and an elastic rod member which has a circular or regular polygonal cross section, having a property of non-biased bending in direction, is used as the longitudinally-appended spring member.

13 Claims, 14 Drawing Sheets

(51) Int. Cl.
    *B60N 2/06* (2006.01)
    *B60N 2/16* (2006.01)
    *B60R 16/027* (2006.01)
    *H02G 3/04* (2006.01)
    *B60R 16/02* (2006.01)
    *B60N 2/02* (2006.01)

(56) References Cited

U.S. PATENT DOCUMENTS

| | | | |
|---|---|---|---|
| 6,494,523 B2 * | 12/2002 | Kobayashi | 296/155 |
| 6,570,093 B2 * | 5/2003 | Doshita | B60R 16/0215 174/135 |
| 6,930,244 B1 * | 8/2005 | Nebel | B60R 16/0207 174/486 |
| 7,561,445 B2 | 7/2009 | Yajima et al. | |
| 7,829,789 B2 * | 11/2010 | Yamaguchi | 174/72 A |
| 8,342,855 B2 | 1/2013 | Tsirangelos et al. | |
| 2001/0004022 A1 | 6/2001 | Kobayashi | |
| 2007/0087618 A1 | 4/2007 | Terada | |
| 2007/0107926 A1 * | 5/2007 | Nishijima et al. | 174/72 A |
| 2007/0119637 A1 | 5/2007 | Yajima et al. | |
| 2007/0187144 A1 * | 8/2007 | Kato | 174/72 A |
| 2008/0142260 A1 | 6/2008 | Yamaguchi | |
| 2009/0056975 A1 * | 3/2009 | Lin | 174/113 R |
| 2010/0155530 A1 | 6/2010 | Tsirangelos et al. | |
| 2011/0163203 A2 | 7/2011 | Tsirangelos et al. | |

FOREIGN PATENT DOCUMENTS

| | | |
|---|---|---|
| CN | 201084863 Y | 7/2008 |
| EP | 1 108 621 A2 | 6/2001 |
| EP | 1 138 555 A2 | 10/2001 |
| EP | 1 777 098 A2 | 4/2007 |
| EP | 1 935 707 A2 | 6/2008 |
| JP | 1080036 A | 3/1998 |
| JP | 2005142113 A | 6/2005 |
| JP | 2006304538 A | 11/2006 |
| JP | 2008154384 A | 7/2008 |
| JP | 200918398 A | 1/2009 |

OTHER PUBLICATIONS

Office Action dated Jul. 30, 2013 issued by the Japanese Patent Office in counterpart Japanese Application No. 2010113376.

Machine translation of previously cited Japanese Publication No. 2008154384 dated Jul. 3, 2008.

Machine translation of previously cited Japanese Publication No. 10080036 dated Mar. 24, 1998.

Machine translation of previously cited Japanese Publication No. 2009018398 dated Jan. 29, 2009.

Machine translation of previously cited Japanese Publication No. 2005142113 dated Jun. 2, 2005.

Extended European Search Report dated May 12, 2014 issued by the European Patent Office in counterpart European Patent Application No. 11783521.5.

Office Action dated May 4, 2014 issued by the State Intellectual Property Office of the People's Republic of China in counterpart Chinese Patent Application No. 201180003957.6.

Office Action dated Dec. 25, 2015, issued by the State Intellectual Property Office of the People's Republic of China in counterpart Chinese Patent Application No. 201410432906.0.

* cited by examiner

FIG.1
(a)
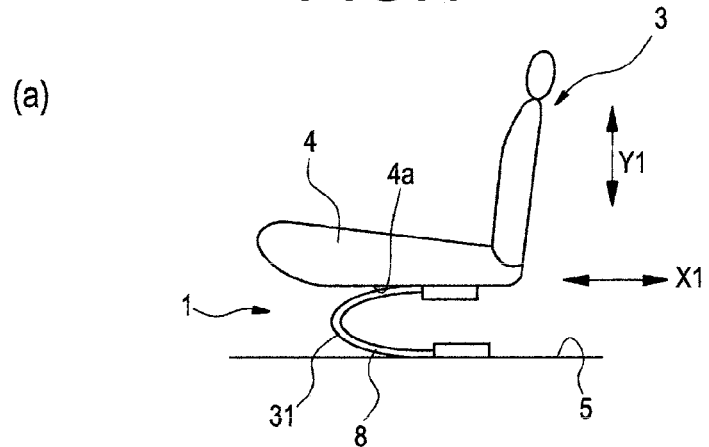
(b)
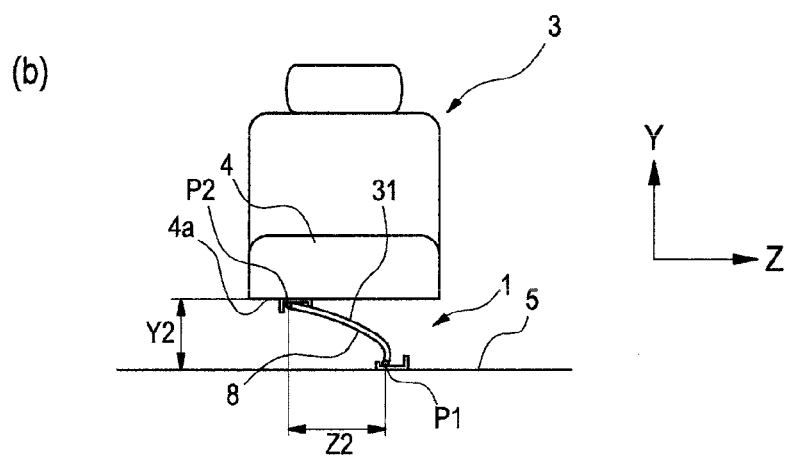
(c)
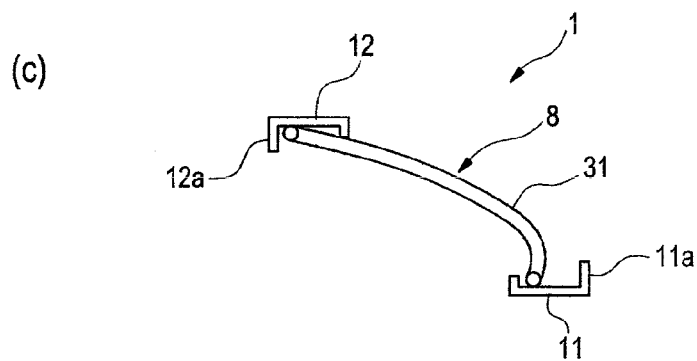

WIRING STRUCTURE OF ELECTRIC WIRE

TECHNICAL FIELD

The present invention relates to a wiring structure of electric wire, in particular to an improved wiring structure of electric wire that increases the efficiency of wiring operation and saves a wiring space at the same time.

BACKGROUND ART

In a vehicle seat, an electrically-operated seat device and an airbag unit device are provided. The electrically-operated seat device adjusts a position of a seat cushion in the back and forth direction and the up and down direction or reclines a seat back to fit to a passenger's posture. The airbag unit device causes an airbag to expand between the passenger and a side door. In the vehicle seat provided with these devices, a plurality of electric wires (a wire harness) is wired to supply power to electrically-operated components.

FIGS. 13 and 14 show an example of wiring structure of electric wire in a vehicle seat in a related art. As shown in FIGS. 13 and 14, a vehicle seat 106 is provided with a side frame 102 into which a seat cushion (not shown in the figure) is installed and a seat back 104 which can be reclined freely around a horizontal rotation shaft 105. In a wiring structure of electric wire 100, a wire bundle (wire harness) 108 consisting of a plurality of electric wires is wired from the bottom of the seat to the seat back 104 in the vehicle seat 106.

The wire bundle 108 is protected by covering with a corrugated tube 109 along a wiring path. For the wire bundle 108, a middle part 109a is wired in parallel and along with the rotation shaft 105, the middle part 109a is fixed to the rotation shaft 105 by a clamp 110, and continuous parts of the wire bundle 108 on both sides of the middle part 109 are fixed to the seat cushion and the seat back 104 by other clamps 112 and 114, respectively.

This kind of wiring structure of electric wire is disclosed in the following Patent Literature 1.

CITATION LIST

Patent Literature

Patent Literature 1: JP2006-304538A

SUMMARY OF THE INVENTION

Technical Problem

However, with the increase of functions of vehicle seats, the number of electrically-operated components increase, and the wire harness which is used to supply power tends to increase its diameter with the increase of the number of harnessed wires. In particular, in the structure that the outside of the wire bundle 108 is covered with the corrugated tube 109, the corrugated tube 109 itself becomes a factor of increasing the diameter. Thus, it is difficult to bend such a thick wire harness to fit it into the narrow space inside the vehicle seat. The increase of the wire bundle diameter leads to the problem of lower operating efficiency when the electric wires are wired.

In addition, since it is hard to bend a thick bundle of electric wires, the curvature radius of the wire harness increases and a bigger wiring space would be required. But, for example, if a vehicle seat is used in a truck, the wiring space that can be ensured under the seat is even smaller than that of passenger cars. Therefore, it becomes a critical issue to save the wiring space when the wire bundle or the like is wired under a seat by including in the middle part an excessive part that is bent to a U-shape to allow sliding movement of the seat.

An object of the present invention is to solve the above problem by providing a wiring structure of electric wire in which the efficiency of wiring electric wires can be improved and the wiring space can be saved.

Solution to Problem

The above object of the present invention is achieved by the following configurations.

(1) A wiring structure of one or a plurality of electric wires between two structures that move relatively, each of electric wires having one end fixed to one of the two structures and the other end fixed to the other of the two structures, the wiring structure including:

an electric wire having a U-shaped excessive part provided along a relatively-moving direction in a middle part of the electric wire to allow the two structures to move relatively; and a longitudinally-appended spring member provided longitudinally along the electric wire for maintaining the excessive part in a U-shape and a bent shape, wherein fixing positions of opposite ends of the electric wire are set to offset positions that are deviated in position respectively in two directions which are perpendicular to the relatively-moving direction of the two structures, and an elastic rod member having a property of nonbiased bending in direction is used as the longitudinally-appended spring member.

(2) A wiring structure of one or a plurality of electric wires between two structures that move relatively, each of electric wires having one end fixed to one of the two structures and the other end fixed to the other of the two structures, the wiring structure including:

an electric wire having a U-shaped excessive part provided along a relatively-moving direction in a middle part of the electric wire to allow the two structures to move relatively; and a longitudinally-appended spring member provided longitudinally along the electric wire for maintaining the excessive part in a U-shape and a bent shape, wherein an elastic rod member having a property of nonbiased bending in direction is used as the longitudinally-appended spring member, and opposite ends of the longitudinally-appended spring member are supported rotatably and regulated in the longitudinal direction of the longitudinally-appended spring member.

(3) The wiring structure of electric wire according to item (2), wherein the fixing positions of the opposite ends of the electric wires are set to offset positions that are deviated in position respectively in two directions which are perpendicular to the relatively-moving direction of the two structures.

(4) The wiring structure of electric wire according to any one of the above (1) to (3), further including two end-supporting members which fix the opposite ends of the wires to the two structures, respectively, wherein a guiding wall is provided on each of the end-supporting members to regulate expansion of the excessive part in a bent state outwardly when the structures moves relatively.

(5) The wiring structure of electric wire according to any one of the above (1) to (4), wherein the elastic rod member has a circular or regular polygonal cross section.

(6) The wiring structure of electric wire according to any one of the above (1) to (5), wherein the electric wire and the longitudinally-appended spring member are accommodated in a protective tube.

(7) The wiring structure of electric wire according to item (6), wherein a plastically-deformable plastic tube is used as the protective tube, and a bundle of the wire and the longitudinally-appended spring member is shaped in a flat cable due to plastic deformation of the protective tube.

According to the configuration of the above (1), the fixing positions of the opposite ends of the electric wires are set to offset positions that are deviated in position respectively in two directions which are perpendicular to the relatively-moving direction of the two structures. In such a wiring arrangement, for example, compared to the situation that the fixing positions of the opposite ends of the electric wires are set to positions deviated in only one of the two directions that are perpendicular to the relatively-moving direction of the two structures, the separating distance between the opposite ends of the electric wires can be set larger, and the curvature radius of the excessive part of the electric wires can be set larger.

Thus, it is easy to bend the excessive part of the electric wires to a U-shape, and the efficiency of wiring the electric wires can be improved.

In addition, according to the configuration of the above (1), by including a longitudinally-appended spring member used as means for maintaining the excessive part of the electric wires to a flexed shape (U-shape), compared with the wiring structure of electric wire in the related art that accommodates electric wires in a corrugated tube, the diameter of the wired wire bundle can be prevented from increasing. Further, according to the configuration of the above (1), since an elastic rod member, having nonbiased bending in direction, is used in the longitudinally-appended spring member, when the bending position of the U-shape in the excessive part of the electric wires changes with the relative movement of the two structures, the elastic rod-shaped member which is longitudinally-appended to the electric wires 21 and 22 bends obediently, and the movement of the bending position is not impeded (influenced) by the bias in the bending direction.

Therefore, the middle parts of the electric wires can be wired as a flexed shape (U-shape) to be reasonably compacted, and the wiring space between the two structures can be saved.

According to the configuration of the above (2), by including a longitudinally-appended spring member used as means for maintaining the excessive part of the electric wires to a flexed shape (U-shape), compared with the wiring structure of electric wire in the related art that accommodates electric wires in a corrugated tube, the diameter of the wired wire bundle can be prevented from increasing. Further, according to the configuration of the above (2), since an elastic rod member, having nonbiased bending in direction, is used in the longitudinally-appended spring member, when the bending position of the U-shape in the excessive part of the electric wires changes with the relative movement of the two structures, the elastic rod-shaped member which is longitudinally-appended to the electric wires 21 and 22 bends obediently, and the movement of the bending position is not impeded (influenced) by the bias in the bending direction.

In addition, generally, a somewhat curl often remains in the initial longitudinally-appended spring member, and a twist force is generated in the longitudinally-appended spring member if the longitudinally-appended spring member when the longitudinally-appended spring member is longitudinally-appended to the excessive part of the electric wires is bent in a direction different from the direction of the initial curl of the longitudinally-appended spring member. Thus, when such twist force is generated in the longitudinally-appended spring member, crook or warp forced out of a plane containing the opposite ends of the longitudinally-appended spring member is generated in the bent longitudinally-appended spring member, which becomes a factor of increasing wiring space. In addition, when the twist force is generated in the longitudinally-appended spring member, a large force becomes necessary for bending operation of the longitudinally-appended spring member and it is difficult to reduce the curvature radius of the longitudinally-appended spring member.

However, according to the configuration of the above (2), since the opposite ends of the longitudinally-appended spring member are rotatably supported, when a twist force is generated in the longitudinally-appended spring member by bending, the twist force generated in the longitudinally-appended spring member can be released by rotation of the longitudinally-appended spring member itself, and the crook or warp caused by the residual twist force can be prevented from generating in the longitudinally-appended spring member. Thus, it also becomes impossible that bending is obstructed by the twist force generated in the longitudinally-appended spring member.

Namely, according to the configuration of the above (2), since the longitudinally-appended spring member can be bent to a simple U-shape in a plane containing the opposite ends of the longitudinally-appended spring member 24, it becomes easy to bend the excessive part of the electric wires to a U-shape, and the efficiency of wiring the electric wires can be improved. The wiring space can be prevented from increasing due to the crook or warp generated in the longitudinally-appended spring member, and the wiring space between the two structures can be saved.

According to the configuration of the above (3), the fixing positions of the opposite ends of the electric wires are set to offset positions that are deviated in position respectively in two directions which are perpendicular to the relatively-moving direction of the two structures. In such a wiring arrangement, for example, compared to the situation that the fixing positions of the opposite ends of the electric wires are set to positions deviated in only one of the two directions that are perpendicular to the relatively-moving direction of the two structures, the separating distance between the opposite ends of the electric wires can be set larger, and the curvature radius of the excessive part of the electric wires can be set larger.

Thus, it is easy to bend the excessive part of the electric wires to a U-shape, and the efficiency of wiring the electric wires can be improved.

According to the configuration of the above (4), when the bending position of the U-shape in the excessive part of the electric wires changes with the relative movement of the two structures, even if the excessive part of the electric wires in a bent state is to expand towards the outside, actually the excessive part is prevented from expanding towards the outside by the regulation of the guiding walls. Therefore, there is no damage to the excessive part of the electric wires by inadvertently interfering with outside articles, or impediment to the relative movement of the two structures.

Thus, while the durability of the electric wires is improved, the operation reliability of the two structures can be improved.

According to the configuration of the above (5), the elastic rod member having nonbiased bending in direction can be formed with a simple configuration.

According to the configuration of the above (6), since the electric wires and the longitudinally-appended spring member are accommodated in the protective tube, when the electric wires move with the relative movement of the two structures, the electric wires do not directly contact with surrounding articles, and the occurrence of such troubles as damage to the electric wires due to the direct contact with the electric wires can be avoided.

According to the configuration of the above (7), if the bundle of the electric wires and the longitudinally-appended spring member becomes a flat cable shape due to plastic deformation of the protective tube, compared with circularly bundled wire bundles, the wire bundle can be easily bent, and it is possible to arrange the wire bundle even in a narrow wiring space. Thus, the wiring space can be further saved.

BRIEF DESCRIPTION OF THE DRAWINGS

In FIG. 1, (a) to (c) are schematic diagrams of a wiring structure of electric wire in a vehicle seat which is an embodiment of a wiring structure of electric wire according to the invention, and (a) in FIG. 1 is a schematic diagram viewed from a side of the vehicle seat, (b) in FIG. 1 is a schematic diagram viewed from the front side of the vehicle seat and (c) in FIG. 1 is an enlarged view of the electric wire shown by (a) in FIG. 1 viewed from the front side of the vehicle seat.

MODE FOR CARRYING OUT THE INVENTION

Figure 2:
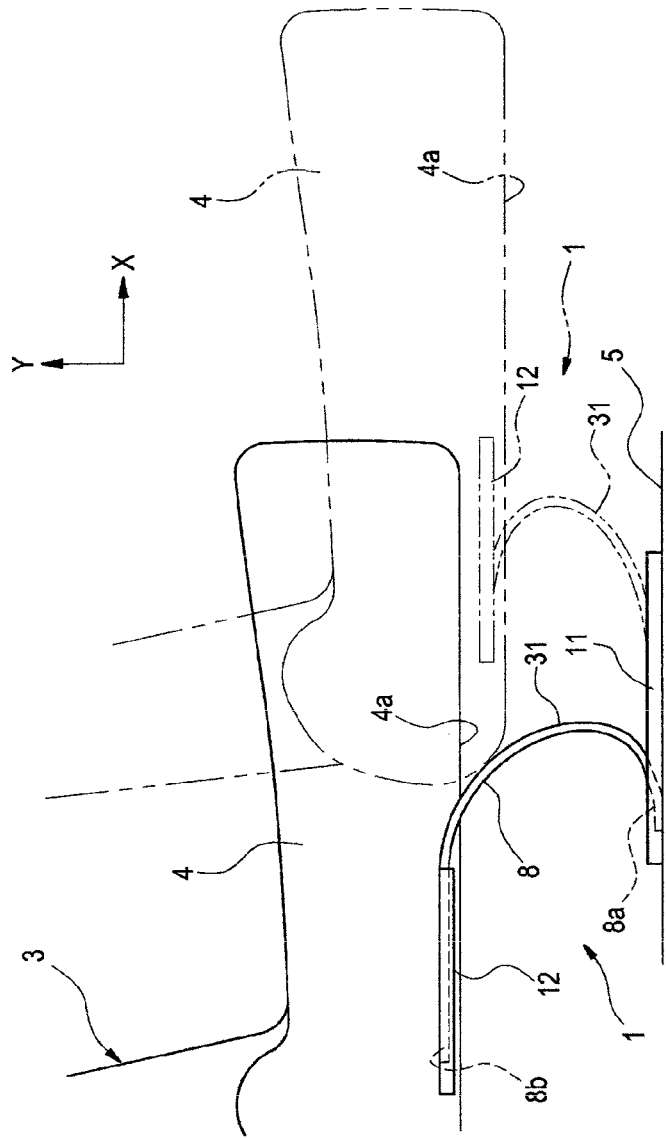
FIG. 2 is a side view for showing sliding movement of the vehicle seat shown in (a) to (c) in FIG. 1 in a back and forth direction when the seating part of the vehicle seat is set to a higher position by a height adjusting mechanism attached to the vehicle seat.

Next, a preferred embodiment of a wiring structure of electric wire according to the invention will be explained in detail with reference to the accompanying figures.

In a wiring structure of electric wire 1 according to an embodiment of the invention, a wire bundle (a wire harness) 8 is wired between a bottom surface 4a of a seating part (a seat cushion) 4 of a vehicle seat 3 in a truck and a floor 5 of the vehicle body on which the vehicle seat 3 is provided.

The vehicle seat 3 is attached to the floor 5 movably (slidably) in a back and forth direction of the vehicle shown by an arrow X1 in (a) of FIG. 1. In addition, the height of the seating part 4 of the vehicle seat 3 (position in a direction of an arrow Y1 in (a) of FIG. 1) can be adjusted by a height adjusting mechanism not shown in the figure.

In FIG. 2, a state in which the seating part 4 is positioned backwards is shown by solid lines, while a state in which the seating part 4 moves forwards is shown by imagined (dashed) lines. In FIG. 2, an arrow X shows a sliding direction of the seating part 4 towards the front of the vehicle, and an arrow Y shows a height adjusting direction of the seating part 4.

The bottom surface 4a of the seating part 4 and the floor 5 are equivalent to two structures that move relatively. Opposite ends of the wire bundle 8 are fixed to these two structures by end supporting members 11 and 12, respectively. To describe in more detail, as shown in FIG. 2, one end 8a of the wire bundle 8 is fixed to the floor 5, which is one of the two structures that move relatively, by the first end supporting member 11. In addition, the other end 8b of the wire bundle 8 is fixed to the bottom surface 4a of the seating part 4, which is the other of the two structures that move relatively, by the second end supporting member 12. The configuration of each of the end supporting members 11 and 12 will be described in detail below.

Figure 3:
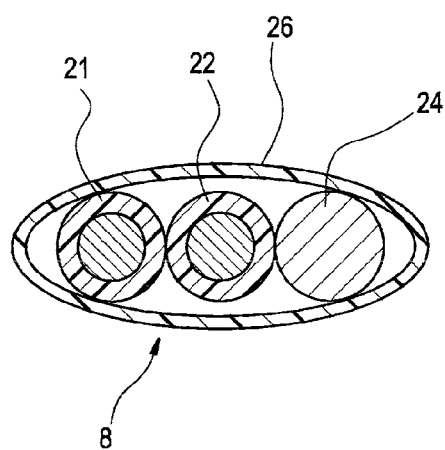
FIG. 3 shows a cross-sectional view of a wire bundle according to the embodiment.
Figure 4:
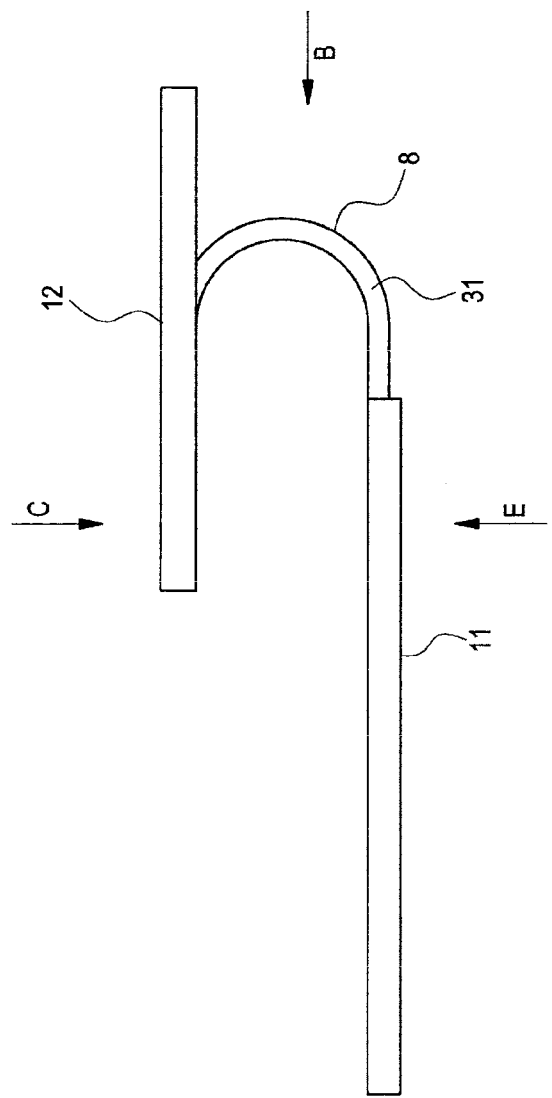
FIG. 4 is an enlarged side view of the wiring structure of electric wire according to the embodiment.

As shown in FIG. 3, the wire bundle 8, opposite ends of which are fixed to the floor 5 and the bottom surface 4a of the seating part 4, includes a plurality of electric wires 21 and 22, a longitudinally-appended spring member 24 which is longitudinally appended to/along these electric wires 21 and 22, and a protective tube 26 which accommodates these electric wires 21 and 22 and the longitudinally-appended spring member 24.

An excessive part 31 is provided in the middle part of each of the electric wires 21 and 22. The excessive part 31 has a U-turned shape along a back and forth direction of the vehicle, which corresponds to the relatively-moving direction of the bottom surface 4a and the floor 5 when the position of the vehicle seat 3 is adjusted in the back and forth direction of the vehicle. The excessive part 31 allows relative movements of the bottom surface 4a and the floor 5 by moving the bent position of the U-shape when the position of the vehicle seat 3 is adjusted in the back and forth direction of the vehicle.

The longitudinally-appended spring member 24 is a member for maintaining the excessive part 31 in a flexed shape (U-shape) by longitudinally appending it to the electric wires 21 and 22. In the embodiment, an elastic rod member, which has a circular or regular polygonal cross section, having a property of nonbiased bending in direction, is used as the longitudinally-appended spring member 24.

In the embodiment, a plastic tube, which can be plastically deformed by pressing process or the like, is used as the protective tube 26. Thus, in the embodiment, as shown in FIG. 3, the wire bundle 8 which is a bundle of the electric wires 21 and 22 and the above longitudinally-appended spring member 24 has a cross section that is shaped in a flat cable (elliptical cross section) by plastic deformation of the protective tube 26.

Figure 5:
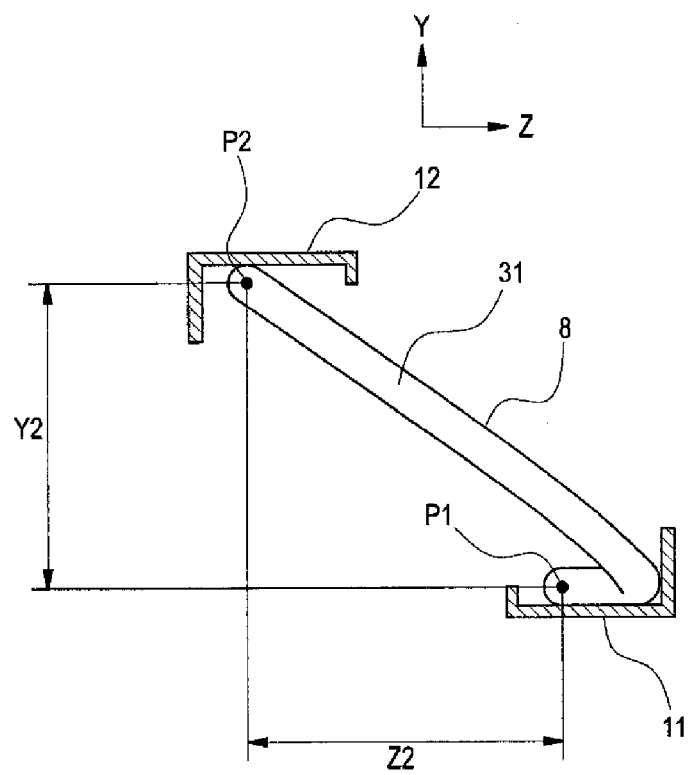
FIG. 5 is a diagram taken in the direction of an arrow B in FIG. 4.

In the embodiment, as shown by (b) in FIG. 1 and in FIG. 5, fixing positions P1 and P2 of the opposite ends of the electric wires 21 and 22 (ends of the wire bundle 8) are set to offset positions that are deviated in position respectively in directions of arrow Y and arrow Z which are perpendicular to the relatively-moving direction of the bottom surface 4a and the floor 5 (the back and forth direction of the vehicle) which are the two structures.

Here, the direction of the arrow Y is an up and down direction of the vehicle, and the direction of the arrow Z is a width direction of the vehicle. In (b) of FIG. 1 and FIG. 5, dimension Y2 is an offset amount in the direction of the arrow Y, and dimension Z2 is an offset amount in the direction of the arrow Z.

Next, a supporting structure of the opposite ends of the wire bundle 8 by the end supporting members 11 and 12 is described in detail.

Figure 6:
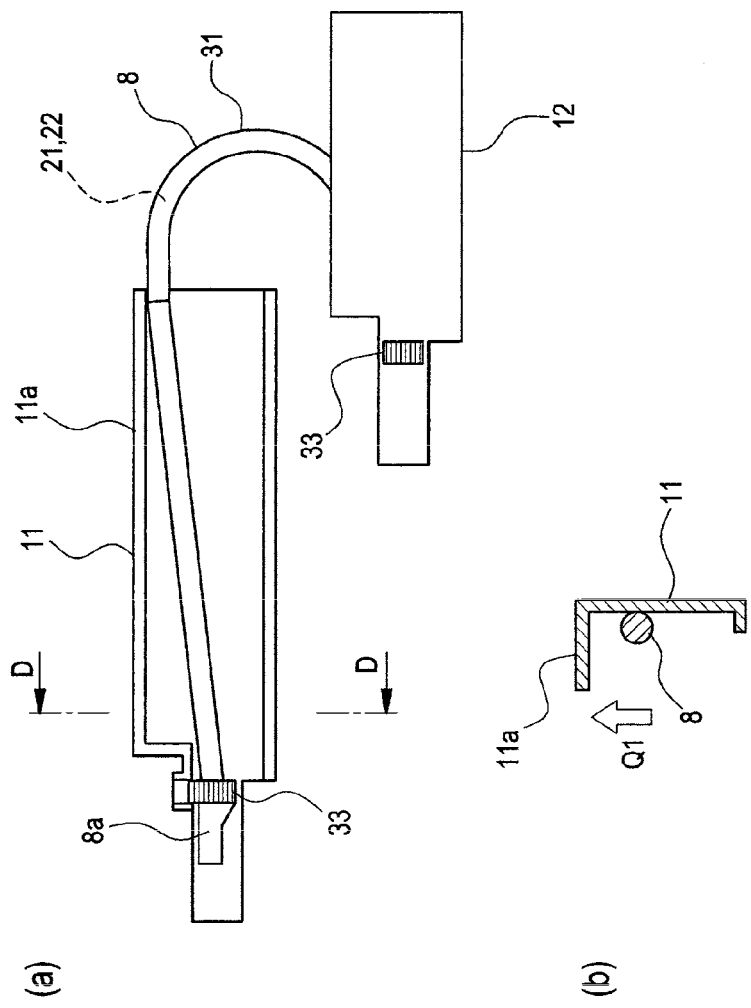
In FIG. 6, (a) is a diagram taken in the direction of an arrow C in FIG. 4, and in FIG. 6, (b) is a cross-sectional view taken from D-D shown by (a) in FIG. 6.
Figure 7:
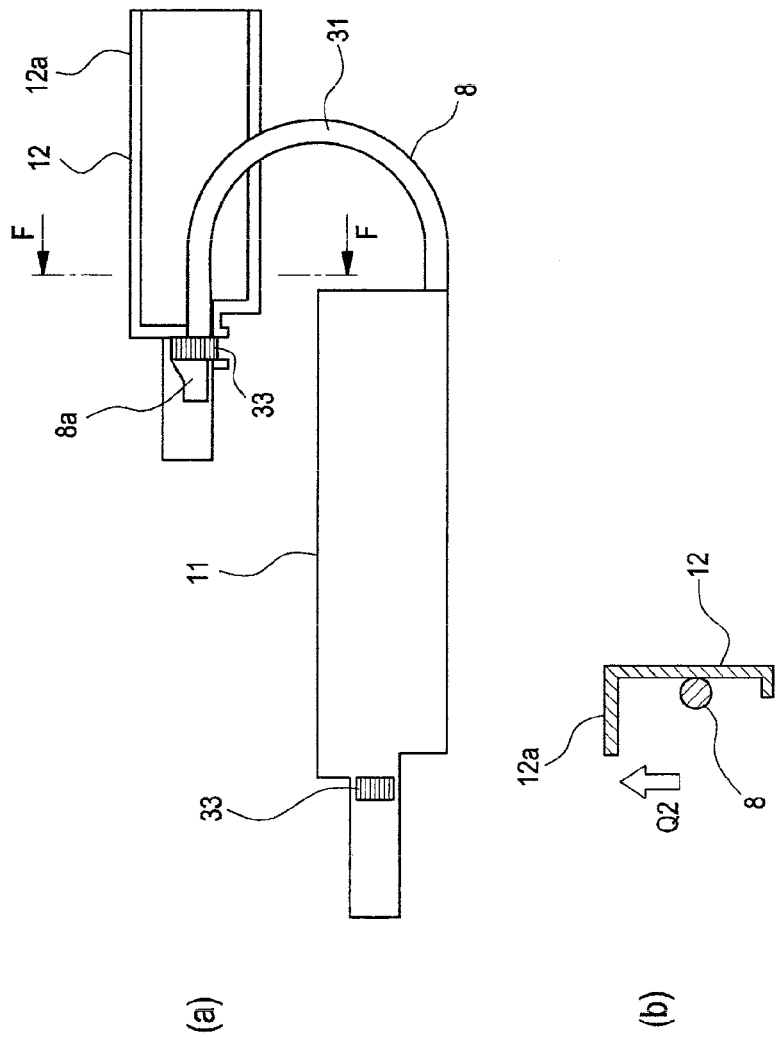
In FIG. 7, (a) is a diagram taken in the direction of an arrow E in FIG. 4, and in FIG. 7, (b) is a cross-sectional view taken from F-F shown by (a) in FIG. 7.
Figure 8:
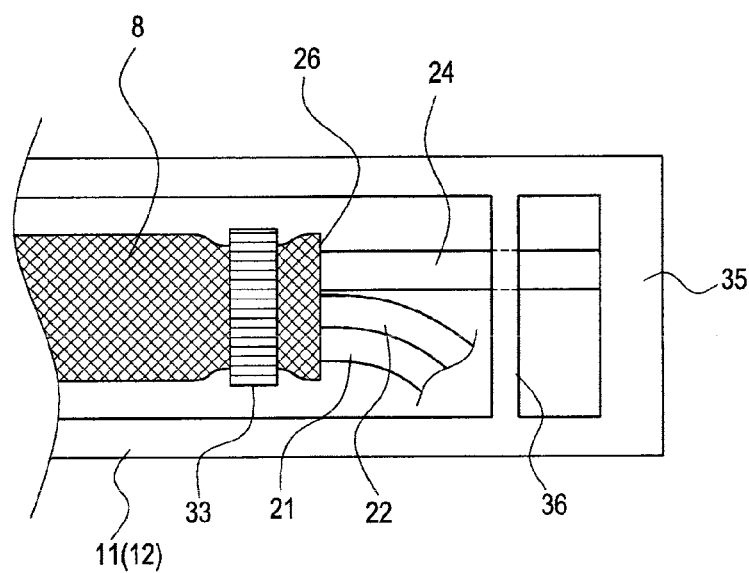
FIG. 8 is an enlarged view of an end supporting structure of electric wires according to the embodiment.

In the embodiment, as shown in FIGS. 6 and 7, the end supporting members 11 and 12, which fix the opposite ends of the wire bundle 8 to the bottom surface 4a of the seating part 4 and the floor 5, regulate a position in width direction of the vehicle and a position in the up and down direction of the vehicle by joining the opposite ends 8a and 8b of the wire bundle 8 with fastening bands 33. In addition, as shown in FIG. 8, each of the end supporting members 11 and 12 has a spring contacting wall 35, onto which an end of the longitudinally-appended spring member 24 which is longitudinally-appended to the electric wires 21 and 22 protrudes, and the movement of the wire bundle 8 in the longitudinal direction (axis direction) is regulated by the spring contacting wall 35. In addition, each of the end supporting members 11 and 12 has a regulatory bar 36 to regulate the part near the ends of the longitudinally-appended spring member 24 not to move out of the end supporting members 11 and 12. By regulating the movement of the longitudinally-appended spring member 24 by the regulatory bar 36, the longitudinally-appended spring member 24 is prevented from separating in a direction perpendicular to the paper in FIG. 8.

The joining by the fastening bands 33 does not regulate the rotation of the longitudinally-appended spring member 24 within the protective tube 26. Namely, when a twist force acts on the longitudinally-appended spring member 24 due to bending of the U-shape, the longitudinally-appended spring member 24 in the protective tube 26 is rotated freely around an axis in the protective tube 26 by the twist force, and the twist force can be released. In addition, since the opposite ends of the longitudinally-appended spring member 24 is positioned by contacting with the spring contacting wall 35 of the end supporting members 11 and 12, and the movement of the opposite ends of the longitudinally-appended spring member 24 is regulated by the regulatory bar 36, even when the bending position of the U-shape changes because the position of the vehicle seat 3 is adjusted in the back and forth direction of the vehicle, the opposite ends of the longitudinally-appended spring member 24 does not move in the longitudinal direction, and does not move out of the end supporting members 11 and 12.

In the embodiment, as shown by (b) in FIG. 6 and (b) in FIG. 7, guiding walls 11a and 12a for regulating position of the excessive part 31 are provided respectively on either side of the excessive part 31 in each of the end supporting members 11 and 12 which support the opposite ends of the wire bundle 8. These guiding walls 11a and 12a regulate the expansion of the excessive part 31 in a bending state towards the outside (a direction of the arrow Q1 in (b) of FIG. 6 or a direction of the arrow Q2 in (b) of FIG. 7), when the bottom surface 4a of the seating part 4 and the floor 5 move relatively in the back and forth direction of the vehicle.

Figure 9:
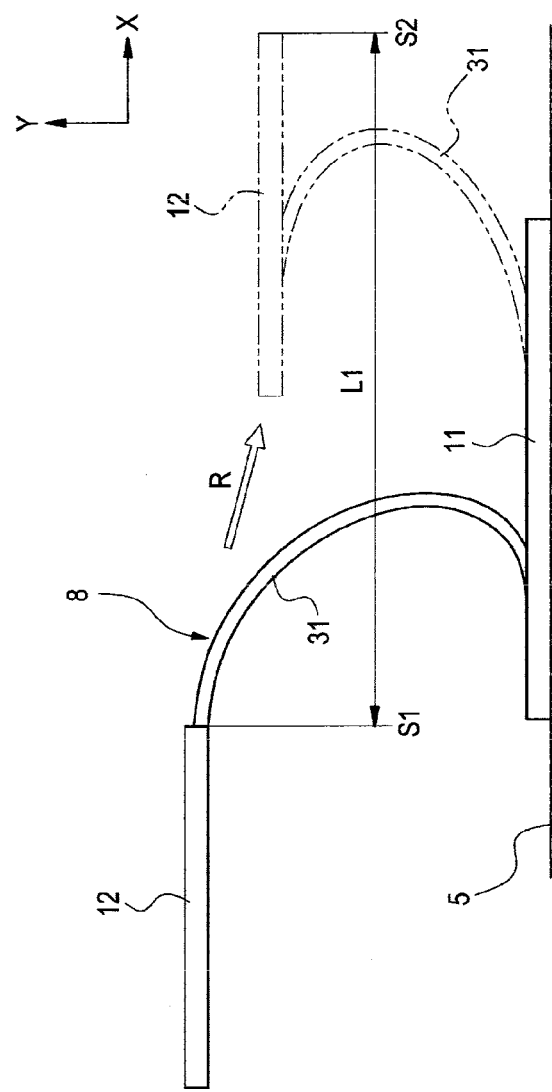
FIG. 9 is a side view for showing movement of electric wires in the wiring structure of electric wire according to the embodiment when the vehicle seat moves (slides) back and forth so that the seating part of the vehicle seat is adjusted to a higher position.

FIG. 9 shows the moving of the excessive part 31 of the wire bundle 8 when the seating part 4 shown in FIG. 2 moves (slides) from an initial position S1 to a first adjusting position S2 in a forward direction of the vehicle for a distance L1. If the vehicle seat 3 is used in a truck, when the seating part 4 moves forwards, as shown by the arrow R, the position of the seating part 4 in a height direction is gradually adjusted downwards with the moving towards the front of the vehicle. Thus, when the seating part 4 moves towards the front of the vehicle, the curvature radius of the bending part of the excessive part 31 is reduced.

Figure 10:
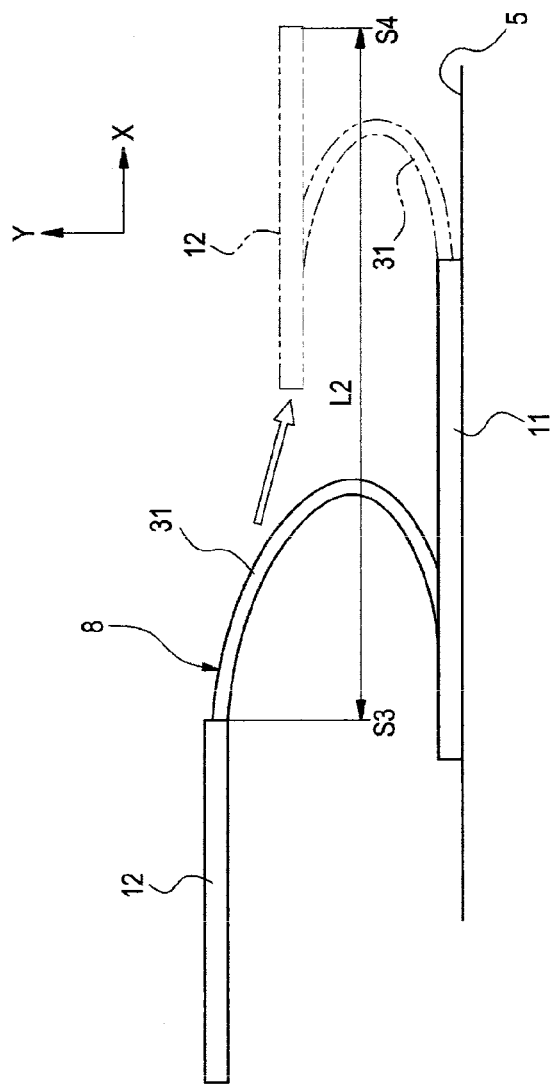
FIG. 10 is a side view for showing movement of electric wires in the wiring structure of electric wire according to the embodiment when the vehicle seat moves (slides) back and forth so that the seating part of the vehicle seat is adjusted to a lower position.

FIG. 10 shows the moving of the excessive part 31 of the wire bundle 8 when the seating part 4 moves (slides) from an initial position S3, which is a position of the seating part 4 lower than that of the state shown in FIG. 2, to a second adjusting position S4 in a forward direction of the vehicle for a distance L2. In this case, when the seating part 4 moves forwards, as shown by the arrow R, the position of the seating part 4 in a height direction is gradually adjusted downward with the moving towards the front of the vehicle. Thus, when the seating part 4 moves towards the front of the vehicle, the curvature radius of the bending part of the excessive part 31 is reduced.

In the wiring structure of electric wire according to the embodiment described above, as shown in FIG. 5, the fixing positions P1 and P2 of the opposite ends of the electric wires 21 and 22 are set to the offset positions that are deviated in position respectively in two directions which are perpendicular to the back and forth direction of the vehicle which is the relatively-moving direction of the two structures, that is, the vehicle seat 3 and the floor 5.

In such wiring structure of electric wire, for example, compared to the situation that the fixing positions P1 and P2 of the opposite ends of the electric wires 21 and 22 are set to deviate only in one of the two directions that are perpendicular to the relatively-moving direction of the two structures, the separating distance between the opposite ends of the electric wires 21 and 22 can be set larger, and the curvature radius of the excessive part 31 of the electric wires 21 and 22 can be set larger.

Thus, it is easy to bend the excessive part 31 of the electric wires 21 and 22 to a U-shape, and the operation efficiency of wiring the electric wires 21 and 22 can be improved.

In addition, in the wiring structure of electric wire according to the embodiment described above, since the longitudinally-appended spring member 24 is included to be used as means for maintaining the excessive part 31 of the electric wires 21 and 22 to a flexed shape (U-shape), compared with the wiring structure of electric wire in the related art that accommodates electric wires in a corrugated tube, the diameter of the wired bundle of the electric wires 21 and 22 can be prevented from increasing.

Further, in the wiring structure of electric wire 1 of the embodiment, since the elastic rod member, which has a circular or regular polygonal cross section, having nonbiased bending in direction, is used in the longitudinally-appended spring member 24, different from the situation that such spring members as plate springs having biased bending in direction are used, when the bending position of the U-shape in the excessive part 31 of the electric wires 21 and 22 changes with the relative movement of the vehicle seat 3 and the floor 5, the elastic rod member which is longitudinally-appended to the electric wires 21 and 22 bends obediently, and the movement of the bending position is not impeded (influenced) by the biased bending in direction.

Therefore, the middle parts of the electric wires 21 and 22 can be wired as a flexed shape (U-shape) to be reasonably compacted, and the wiring space between the seating part 4 of the vehicle seat 3 and the floor 5 can be saved.

Further, in the wiring structure of electric wire 1 according to the embodiment described above, when the bending position of the U-shape in the excessive part 31 of the electric wires 21 and 22 changes with the relative movement of the vehicle seat 3 and the floor 5, even if the excessive part 31 of the electric wires 21 and 22 in a bent state is to expand towards the outside, actually the excessive part 31 is prevented from expanding towards the outside by the regulation of the guiding walls 11a and 12a. Therefore, there is no damage to the excessive part 31 of the electric wires 21 and 22 by inadvertently interfering with outside articles, or impediment to the relative movement of the vehicle seat 3 and the floor 5 which are the two structures.

Thus, while the durability of the electric wires 21 and 22 is improved, the operation reliability of the two structures can be improved.

Figure 11:
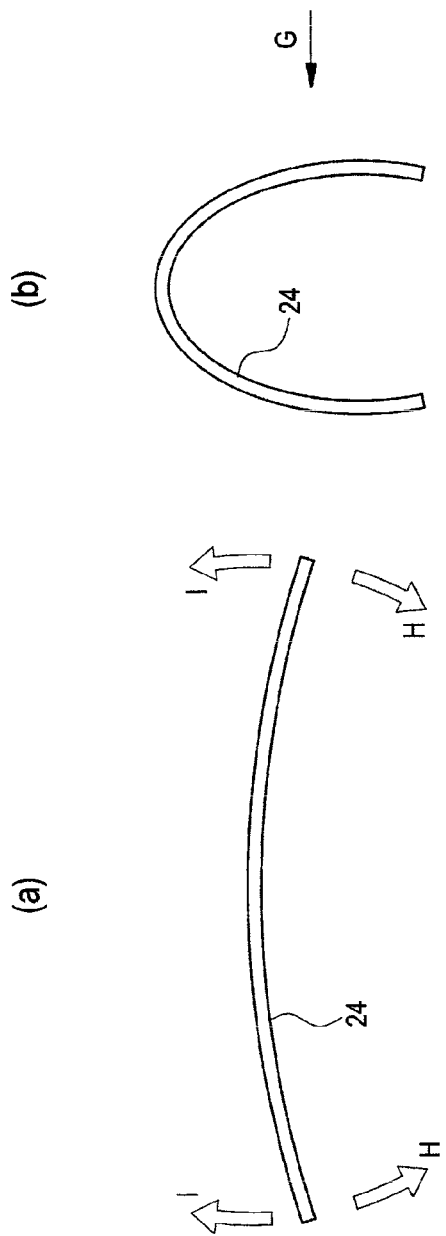
In FIG. 11, (a) is a diagram illustrating an initial state of a longitudinally-appended spring member in the wiring structure of electric wire according to the embodiment before the longitudinally-appended spring member is longitudinally-appended to electric wires; and in FIG. 11, (b) is a front view of the longitudinally-appended spring member of (a) in FIG. 11 when the longitudinally-appended spring member is bent to a U-shape.

In addition, generally, in the initial longitudinally-appended spring member 24, as shown by (a) in FIG. 11, a somewhat curl often remains. Thus, when the longitudinally-appended spring member 24 in which the initial curl remains is bent to a U-shape as shown by (b) in FIG. 11, the bent shape varies with the direction in which the longitudinally-appended spring member 24 is bent.

Figure 12:
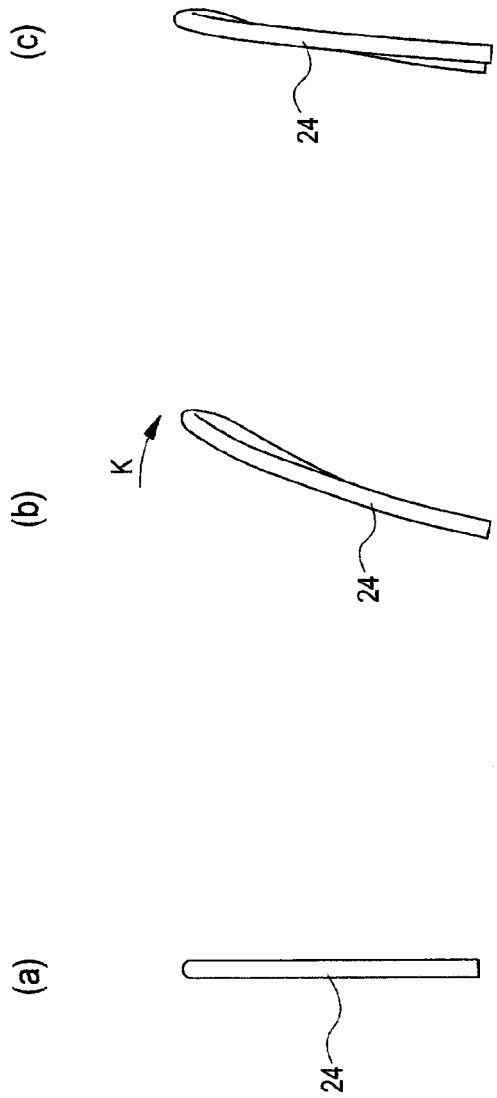
In FIG. 12, (a) to (c) are side views of the longitudinally-appended spring member when it is bent to a U-shape (taken in the direction of arrow G shown by (b) in FIG. 11), wherein (a) in FIG. 12 is a side view when the longitudinally-appended spring member is bent in the same direction as the initial curl of the longitudinally-appended spring member (a direction indicated by arrow H shown by (a) in FIG. 11), in FIG. 12, (b) is a side view when the longitudinally-appended spring member is bent in a direction perpendicular to the initial curl of the longitudinally-appended spring member (a direction perpendicular to the paper shown by (a) in FIG. 11), and in FIG. 12, (c) is a side view when the longitudinally-appended spring member is bent in a direction reverse to the initial curl of the longitudinally-appended spring member (a direction indicated by arrow I shown by (a) in FIG. 11).
Figure 13:
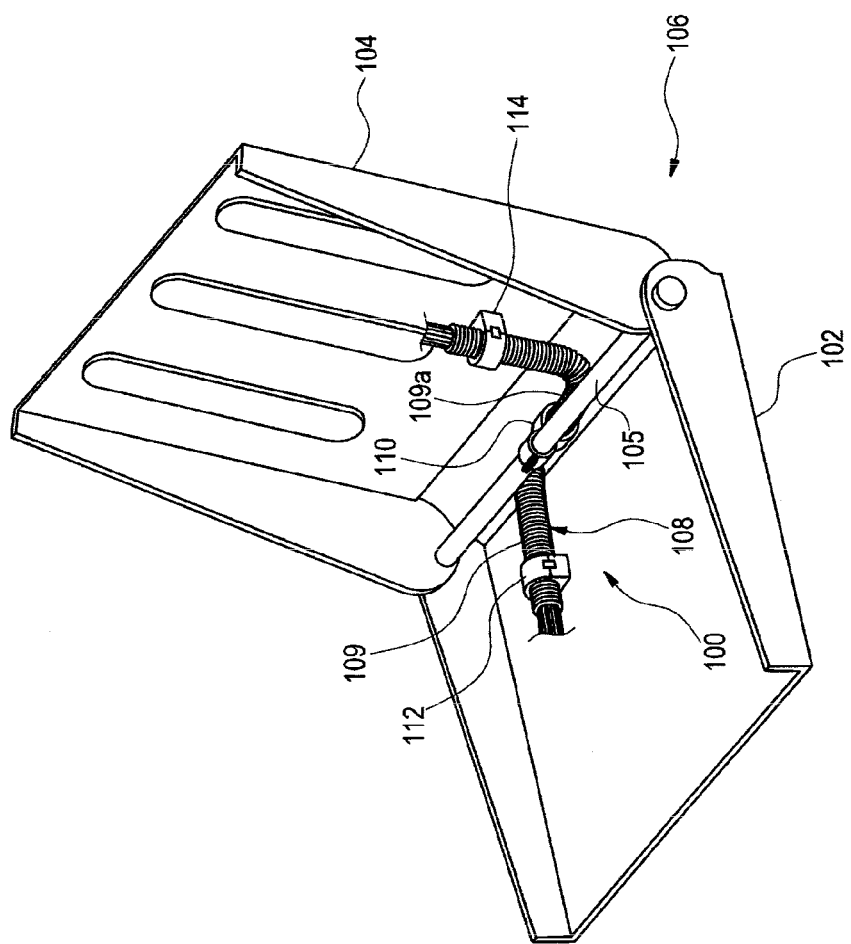
FIG. 13 is a wiring diagram of a wire harness in a related art.
Figure 14:
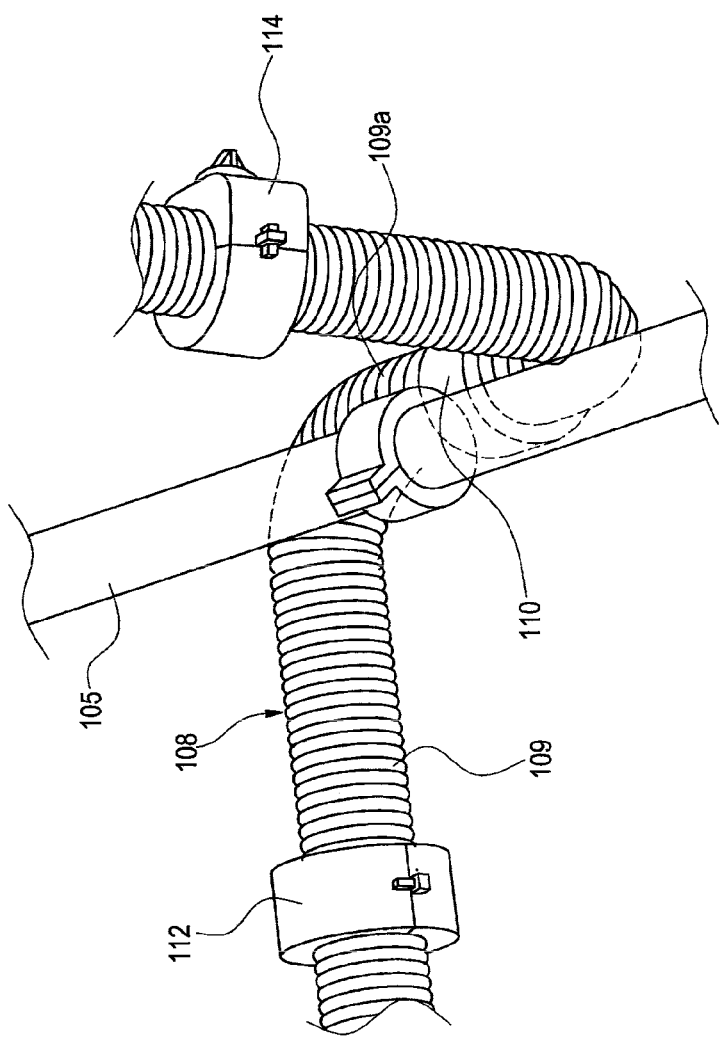
FIG. 14 is an enlarged view of main parts in FIG. 13.

In FIG. 12, (a) to (c) show different shapes viewed from side (shapes viewed in the direction of the arrow G in (b) of FIG. 11) by changing the direction in which the longitudinally-appended spring member 24 is bent to a U-shape.

In FIG. 12, (a) is a case when the longitudinally-appended spring member 24 is bent in the same direction as the bending direction of the initial curl of the longitudinally-appended spring member 24 (a direction indicated by the arrow H in (a) of FIG. 11). In this case, the shape of the excessive part 31 viewed from side become generally flat, and a bent shape suitable for space-saving wiring can be obtained.

On the other hand, in FIG. 12, (b) is a case when the longitudinally-appended spring member 24 is bent in a direction perpendicular to the bending direction of the initial curl of the longitudinally-appended spring member 24 (a direction perpendicular to the paper in (a) of FIG. 11), the shape of the excessive part 31 viewed from side become a shape that crooks in a direction indicated by arrow K, which is unsuitable for space-saving wiring.

In addition, in FIG. 12, (c) is a case when the longitudinally-appended spring member 24 is bent in a direction reverse to the bending direction of the initial curl of the longitudinally-appended spring member 24 (a direction indicated by arrow I in (a) of FIG. 11), there is warp in the bent shape of the longitudinally-appended spring member 24, which is also unsuitable for space-saving wiring. In addition, since a twist force is generated in the longitudinally-appended spring member 24 when the longitudinally-appended spring member 24 is bent as shown in (b) and (c) of FIG. 12, a large force becomes necessary for bending operation. This also causes troubles as it is difficult to bend.

Therefore, when the longitudinally-appended spring member 24 is bent to a U-shape, a twist force is generated in the longitudinally-appended spring member 24 due to the additional bending direction. Thus, when such twist force is generated in the longitudinally-appended spring member 24, the crook or warp forced out of a plane containing the opposite ends of the longitudinally-appended spring member 24 is generated in the bent longitudinally-appended spring member 24, which becomes a factor of increasing wiring space. In addition, when the twist force is generated in the longitudinally-appended spring member 24, a large force becomes necessary for bending operation of the longitudinally-appended spring member 24 and it is difficult to reduce the curvature radius of the longitudinally-appended spring member 24.

However, in the wiring structure of electric wire 1 according to the embodiment described above, since the opposite ends of the longitudinally-appended spring member 24 are rotatably supported, when a twist force is generated in the longitudinally-appended spring member 24 by bending, the twist force generated in the longitudinally-appended spring member 24 can be released by rotation of the longitudinally-appended spring member 24 itself, and the crook or warp caused by the residual twist force can be prevented from generating in the longitudinally-appended spring member 24. Thus, it also becomes impossible that bending is obstructed by the twist force generated in the longitudinally-appended spring member 24.

Namely, in the wiring structure of electric wire 1 according to the embodiment, since the longitudinally-appended spring member 24 can be bent to a simple U-shape in a plane containing the opposite ends of the longitudinally-appended spring member 24, it becomes easy to bend the excessive part 31 of the electric wires 21 and 22 to a U-shape, and the efficiency of wiring the electric wires 21 and 22 can be improved. The wiring space can be prevented from increasing due to the crook or warp generated in the longitudinally-appended spring member 24, and the wiring space between the two structures can be saved.

In addition, in the wiring structure of electric wire 1 according to the embodiment described above, since the electric wires 21 and 22 and the longitudinally-appended spring member 24 are accommodated in the protective tube 26, when the electric wires 21 and 22 move with the relative movement of the vehicle seat 3 and the floor 5, the electric wires 21 and 22 do not directly contact with surrounding articles, and the occurrence of such troubles as damage to the electric wires 21 and 22 due to the direct contact with the electric wires 21 and 22 can be avoided.

In addition, in the wiring structure of electric wire 1 according to the embodiment described above, as shown in FIG. 3, the bundle of the electric wires 21 and 22 and the longitudinally-appended spring member 24 is formed in a flat cable shape by plastic deformation of the protective tube 26. Therefore, compared with circularly bundled wire bundles, the wire bundle 8 can be easily bent, and it is possible to wire the wire bundle 8 even in a narrow wiring space. Thus, the wiring space can be further saved.

Although the invention is described with reference to the detailed and specific embodiments above, the wiring structure of electric wire of the invention is not limited to the above mentioned embodiments, but instead appropriate variations, modifications, etc. are possible. In addition, materials, shapes, dimensions, etc. of the components of the invention are free to choose as long as the object of the invention can be achieved, but not limited to the embodiments described above.

For example, the location where the wiring structure of electric wire according to the invention can be applied is not limited to the space between the vehicle seat and the floor shown in the above embodiment. For example, the invention can be also applied to a wire harness wiring for supplying power to a sliding door. In addition, the number of the electric wires the wire bundle 8 is formed of is not limited to the above embodiment. The number of the electric wires the wire bundle 8 is formed of can be any number that is one or more than one in accordance with the specification of connected equipments. Further, the specific fixing structure of the ends of the wire bundle 8 or the specific structure of the end supporting members 11 and 12 is not limited to the above embodiments, but any design changes or improvements without departing from the spirit of the invention are possible.

In addition, the configuration of vehicle seats is not limited to the above embodiments in which the position may be adjusted in the back and forth direction and the up and down direction, but instead the position may be adjusted only in any one direction. Further, a vibration absorbing mechanism which always absorbs vibration of vehicle seats in the up and down direction may be included.

This application is based on the Japanese patent application (patent application No. 2010-113376) filed on May 17, 2010, and the Japanese patent application (patent application No. 2010-113377) filed on May 17, 2010, the contents of which are incorporated herein by reference.

INDUSTRIAL APPLICABILITY

According to the wiring structure of electric wire in the invention, since the fixing positions of the opposite ends of the electric wires are set to offset positions that are deviated in position respectively in two directions which are perpendicular to the relatively-moving direction of the two structures, the curvature radius of the excessive part of the electric wires can be set larger. Thus, it is easy to bend the excessive part of the electric wires to a U-shape, and the efficiency of wiring the electric wires can be improved.

In addition, according to the wiring structure of electric wire in the invention, by including a longitudinally-appended spring member used as means for maintaining the excessive part of the electric wires to a flexed shape (U-shape), compared with the wiring structure of electric wire in the related art that accommodates electric wires in a corrugated tube, the diameter of the wired wire bundle can be prevented from increasing. Further, since an elastic rod member, which has a circular or regular polygonal cross section, having nonbiased bending in direction, is used in the longitudinally-appended spring member, when the bending position of the U-shape in the excessive part of the electric wires changes with the relative movement of the two structures, the movement of the bending position is not impeded (influenced) by the biased bending in direction. Therefore, the middle parts of the electric wires can be wired as a flexed shape (U-shape) to be reasonably compacted, and the wiring space between the two structures can be saved.

REFERENCE SIGNS LIST

1: wiring structure of electric wire
3: vehicle seat
4: seating part
4a: bottom surface (structure)
5: floor (structure)
8: wire bundle (wire harness)
21, 22: electric wire
24: longitudinally-appended spring member
26: protective tube
31: excessive part
P1, P2: fixing position of wire end

The invention claimed is:

1. A wiring structure having one or a plurality of electric wires extending between two structures that move relatively, each of the electric wires having one end attached to one of the two structures and the other end attached to the other of the two structures, the wiring structure comprising:
  an electric wire of the electric wires having a U-shaped excessive part provided along a relatively-moving direction in a middle part of the electric wire to allow the two structures to move relatively;
  a longitudinally-appended spring member provided longitudinally along the electric wire and configured to maintain the excessive part in a U-shape; and
  a regulatory bar provided within each of the two structures surrounding opposite ends of the longitudinally-appended spring member,
  wherein
    the longitudinally-appended spring member is an elastic rod member having a property of nonbiased bending in direction,
    the opposite ends of the longitudinally-appended spring member are supported rotatably with respect to the two structures, respectively, and regulated in the longitudinal direction of the longitudinally-appended spring member, and
    the opposite ends of the longitudinally-appended spring member are rotatable about a longitudinal axis of the longitudinally-appended spring member and the regulatory bar of each of the two structures regulates the opposite ends of the longitudinally-appended spring member such that the longitudinally-appended spring member rotates freely around the longitudinal axis.

2. The wiring structure of electric wire according to claim 1, wherein
  attaching positions of the opposite ends of the electric wires are set to offset positions that are deviated in position respectively in two directions which are perpendicular to the relatively-moving direction of the two structures.

3. The wiring structure of electric wire according to claim 1, further comprising
  two end-supporting members which fix the opposite ends of the wires to the two structures, respectively, wherein
  a guiding wall is provided on each of the end-supporting members and is configured to regulate outward expansion of the excessive part when in a bent state when the structures moves relatively.

4. The wiring structure of electric wire according to claim 1, wherein
  the elastic rod member has a circular or regular polygonal cross section.

5. The wiring structure of electric wire according to claim 1, wherein
  the electric wire and the longitudinally-appended spring member are accommodated in a protective tube.

6. The wiring structure of electric wire according to claim 5, wherein the protective tube includes a plastically-deformable plastic tube, and a bundle of the wire and the longitudinally-appended spring member is shaped in a flat cable due to plastic deformation of the protective tube.

7. The wiring structure according to claim 1, further comprising fastening bands with which the electric wire and the longitudinally-appended spring member are fastened to regulate movements of the electric wire and the longitudinally-appended spring member, and to allow rotations about the longitudinal axis of the electric wire and the longitudinally-appended spring member.

8. A wiring structure having one or a plurality of electric wires extending between two structures that move relatively, each of the electric wires having one end attached to one of the two structures and the other end attached to the other of the two structures, the wiring structure comprising:
   an electric wire of the electric wires having a U-shaped excessive part provided along a relatively-moving direction in a middle part of the electric wire to allow the two structures to move relatively;
   a longitudinally-appended spring member provided longitudinally along the electric wire and configured to maintain the excessive part in a U-shape; and
   a regulatory bar provided within each of the two structures surrounding opposite ends of the longitudinally-appended spring member,
   wherein
      attaching positions of opposite ends of the electric wire are set to offset positions that are deviated in position respectively in two directions which are perpendicular to the relatively-moving direction of the two structures,
      the longitudinally-appended spring member is an elastic rod member that is substantially rotationally symmetric about a longitudinal axis of the longitudinally-appended spring member such that the longitudinally-appended spring member has a property of nonbiased bending in direction, and
      the opposite ends of the longitudinally appended spring member are supported rotatably with respect to the two structures, respectively, and the regulatory bar of each of the two structures regulates the opposite ends of the longitudinally-appended spring member such that the longitudinally-appended spring member rotates freely around the longitudinal axis.

9. The wiring structure of electric wire according to claim 8, further comprising
   two end-supporting members which fix the opposite ends of the wires to the two structures, respectively, wherein
   a guiding wall is provided on each of the end-supporting members and is configured to regulate outward expansion of the excessive part when in a bent state when the structures moves relatively.

10. The wiring structure of electric wire according to claim 8, wherein
    the elastic rod member has a circular or regular polygonal cross section.

11. The wiring structure of electric wire according to claim 8, wherein
    the electric wire and the longitudinally-appended spring member are accommodated in a protective tube.

12. The wiring structure of electric wire according to claim 11, wherein
    the protective tube includes a plastically-deformable plastic tube, and a bundle of the wire and the longitudinally-appended spring member is shaped in a flat cable due to plastic deformation of the protective tube.

13. The wiring structure according to claim 8, further comprising fastening bands with which the electric wire and the longitudinally-appended spring member are fastened to regulate movements of the electric wire and the longitudinally-appended spring member, and to allow rotations about the longitudinal axis of the electric wire and the longitudinally-appended spring member.

* * * * *